(12) United States Patent
Krounbi et al.

(10) Patent No.: US 7,386,933 B1
(45) Date of Patent: Jun. 17, 2008

(54) METHOD OF FABRICATING THIN FILM WRITE HEADS WITH A SHORTENED YOKE AND IMPROVED DIMENSION CONTROL

(75) Inventors: Mohamad T. Krounbi, San Jose, CA (US); Ming Zhao, Fremont, CA (US); Yining Hu, Fremont, CA (US); Jim Watterston, Carson City, NV (US)

(73) Assignee: Western Digital (Fremont), LLC, Fremont, CA (US)

( * ) Notice: Subject to any disclaimer, the term of this patent is extended or adjusted under 35 U.S.C. 154(b) by 201 days.

(21) Appl. No.: 11/295,243

(22) Filed: Dec. 6, 2005

Related U.S. Application Data

(62) Division of application No. 10/375,539, filed on Feb. 27, 2003, now Pat. No. 7,006,327.

(51) Int. Cl.
*G11B 5/127* (2006.01)
*H04R 31/00* (2006.01)

(52) U.S. Cl. ............ 29/603.16; 29/603.13; 29/603.14; 29/603.15; 29/603.18; 216/65; 360/122; 360/317; 451/5; 451/41

(58) Field of Classification Search ............... 29/603.13–603.16, 603.18; 216/65; 360/122, 360/126, 317; 427/127, 128; 451/5, 41
See application file for complete search history.

(56) References Cited

U.S. PATENT DOCUMENTS

| | | | |
|---|---|---|---|
| 5,512,394 A | 4/1996 | Levenson et al. | |
| 5,712,751 A | 1/1998 | Yoda et al. | |
| 6,029,339 A | 2/2000 | Chang et al. | |
| 6,134,089 A * | 10/2000 | Barr et al. | 360/322 |
| 6,198,609 B1 | 3/2001 | Barr et al. | |
| 6,222,707 B1 | 4/2001 | Huai et al. | |
| 6,255,040 B1 | 7/2001 | Sasaki | |
| 6,333,841 B1 | 12/2001 | Sasaki | |
| 6,421,212 B1 | 7/2002 | Gibbons et al. | |
| 6,452,759 B2 | 9/2002 | Urai | |
| 6,462,915 B1 | 10/2002 | Sasaki | |
| 6,466,404 B1 | 10/2002 | Crue, Jr. et al. | |
| 6,483,665 B1 | 11/2002 | Sasaki | |
| 6,781,790 B1 | 8/2004 | Sasaki | |
| 6,900,963 B1 | 5/2005 | Sato | |
| 2002/0044379 A1 | 4/2002 | Kobayashi et al. | |
| 2002/0060879 A1 | 5/2002 | Sato | |

* cited by examiner

*Primary Examiner*—Paul D Kim
(74) *Attorney, Agent, or Firm*—Hogan & Hartson

(57) ABSTRACT

A method for fabricating a magnetic recording head writer. The writer includes a bottom magnetic pole and a write gap formed over the bottom pole and a coil trench formed in the bottom pole. A top magnetic pole is provided as two layers with the first layer including front and back tips with spaced apart walls positioned adjacent the trench bottom defining trench sides. A pole cover layer is included that is made up of a thin layer of insulating material deposited to cover sides and bottom of the coil trench. A bottom coil is formed on the pole cover layer in the bottom of the coil trench and coil insulation is provided between coil elements and adjacent trench walls and covemg the coil. A top coil with insulation is formed over the planarized bottom coil insulation and the top pole second layer is formed over the top coil.

21 Claims, 4 Drawing Sheets

METHOD OF FABRICATING THIN FILM WRITE HEADS WITH A SHORTENED YOKE AND IMPROVED DIMENSION CONTROL

CROSS-REFERENCE TO RELATED APPLICATIONS

This application is a divisional of U.S. patent application Ser. No. 10/375,539 filed on Feb. 27, 2003, which is incorporated herein by reference in its entirety.

BACKGROUND OF THE INVENTION

1. Field of the Invention

The present invention relates generally to the field of magnetic read/write heads and magnetic data storage, and more particularly, to a thin film write head, and method of making such head, including a separator layer of insulating material providing a cover over front and back tips of the top pole to reduce the separation distance between the bottom coil turns and the front and back pole tips which reduces the yoke length.

2. Relevant Background

Data is stored on magnetic media by writing on the magnetic media using a write head. Magnetic media can be formed in any number of ways, such as tape, floppy diskette, and hard disk. Writing involves storing a data bit by utilizing magnetic flux to set the magnetic moment of a particular area on the magnetic media. The state of the magnetic moment is later read, using a read head, to retrieve the stored information. Data density is determined by the amount of data stored on an area of magnetic media and depends on how much area must be allocated to each bit. Data on magnetic media is often stored in a line or track. Magnetic media often have multiple tracks. In the case of disks, the tracks are nested annular rings with more bits per track and more tracks per disk increasing data density. Data density or areal density, therefore, is determined by both the bit length and by the width of the bit. To decrease bit size, head size is decreased by fabricating thin film read and write heads.

Ongoing, important goals of researchers in magnetic recording technology include producing disk drive read heads that achieve strong signals, providing accurate read back of those signals, minimizing noise interference, and providing very high areal density while controlling manufacturing costs. Unfortunately, some of these goals directly conflict with one another. For example, to achieve ever-higher areal densities, track widths on a disk become smaller necessitating that the components used to read and write data also become smaller, which makes manufacturing more difficult and expensive.

Generally, the writer element of a thin film head is fabricated using top and bottom magnetic pole pieces and a multi-turn coil, which is wound between the top and bottom poles. The coil is defined on top of the lower pole prior to the formation of the upper pole. FIG. 1 illustrates one exemplary prior art read/write head fabricated as a conventional composite-type thin film magnetic head, and the following is a brief description of typically head manufacturing steps of such a head. The composite type thin film magnetic head in this embodiment has a reading GMR reproducing element on a substrate and a writing inductive type thin film magnetic head stacked on the reading element. Since in practically manufacturing a thin film magnetic head, many thin film magnetic heads are formed on a wafer at the same time, the end of each thin film magnetic head is not shown.

An insulating layer 2, e.g., alumina, is formed in a thickness of about 1 to 5 μm on a substrate 1, e.g., AlTiC, on which a first magnetic layer 3 constituting one magnetic shield layer to protect the reading GMR element from an external magnetic field is formed in a thickness of 2-3 μm. Then, a first shield gap layer 4 is sputter formed of an insulating material, e.g., alumina, in a thickness of about 50-150 nm, and thereafter a multilayered structure-magnetoresistive layer 5 constituting the GMR reproducing element is formed such as at a thickness of less than 100 nm. For forming the magnetoresistive layer 5 into a desired pattern, a photoresist layer is formed on the layer 5. The photoresist layer can be formed in a shape for easy lift off, for example, a T-shape. Next, the magnetoresistive layer 5 is ion-milled through the photoresist film as a mask, and thereby is formed in a desired pattern. Then, a second shield gap film 8, e.g., alumina, is formed in a thickness of 50-150 nm to embed the magnetoresistive layer 5 into the first and second shield gap layers 4, 8, and a second magnetic layer 9, e.g., permalloy, is formed in a thickness of 2-6 μm. The second magnetic layer 9 works not only to magnetically shield the GMR reproducing element along with the magnetic layer 3, but also as the bottom pole in the thin film recording head.

A write gap layer 10 made of nonmagnetic material, e.g., alumina, is formed in a thickness of about 50-300 nm on the second magnetic layer 9 and thereafter an insulating layer 11 made of photoresist is formed in a thickness of 0.5-2 μm corresponding to a given pattern. Then, a first layer, thin film coil 12 is formed, such as in a thickness of 3 μm, with a photoresist film 13 providing insulation separation from the top pole 16. The insulating layer 13 made of photoresist to cover the first layer-thin film coil 12 is typically flattened by a thermal treatment, and a second layer-thin film coil 14 is formed, such as in a thickness of 3 μm, so as to be insulation separated by and also supported by an insulating layer 15 made of photoresist. The insulating layer 15 made of photoresist to cover the second layer-thin film coil 14 is flattened by a thermal treatment, and thereafter, a third magnetic layer or top pole 16 is formed corresponding to a given pattern and is typically made of a permalloy material or FeN material having a high saturated magnetic flux density.

Fabrication of the head shown in FIG. 1 has presented a number of challenges and sometimes less than desirable results. The coil element 12 is insulated from the front and back (or adjacent) pieces of the top pole 16 by cured photoresist 13, and to achieve desired insulation results, the final dimensions of this photoresist insulation 13 must be carefully controlled to insure that it is thick enough to not only effectively insulate the coil turns 12 but to also endure subsequent manufacturing processes without erosion that would expose the coil 12 (i.e., fail to adequately insulate the bottom coil 12 from the top coil 14 or the top pole 16). As a result, prior art heads have generally been fabricated with a relatively large thickness of photoresist between the end turns of the bottom coil 12 and the adjacent front and back pieces of the top pole 16, as shown by the separation distance, dSEP, in FIG. 1. Additionally, the slope (as shown at 17) of the cured resist insulator 13 must be controlled within exacting limits to allow formation of the top pole 16 by photolithography. These two limitations result in extended processing times to properly cure the resist insulator 13. Further, the top pole 16 has an undesirably large yoke length, $L_{YOKE}$, to accommodate the larger coil and insulator stacks. Head fabrication is further complicated because photolithography of the top pole 16 must be performed on surfaces with substantial topography and large step heights that can result in ineffective control of the dimensions of the elements of the produced head.

Hence, there remains a need for a thin film write head and corresponding manufacturing processes that support the need for tight dimension controls and adequate insulation between coils and pole elements while reducing fabrication complexity, processing times, and costs and furthering head design goals such as reduced pole length.

SUMMARY OF THE INVENTION

The present invention addresses the above problems by providing a writer for use in write heads and read/write heads that is configured to provide a reduce separation distance between bottom coil elements and the top pole. The design of the writer reduces processing times and costs while also enhancing dimensional control of the writer fabrication. Briefly, the writer of the invention includes a bottom magnetic pole with a planar upper surface in which material is removed to form a recessed area that defines a bottom of a coil trench. A write gap layer is formed over the upper surface of the bottom pole and extends at least partially over the bottom of the coil trench. The writer further includes a top magnetic pole that is formed as two layers. The first layer includes a front pole tip and a back pole tip that each include an interior side wall that is substantially vertical (e.g., perpendicular to the upper surface of the bottom pole), spaced apart, and positioned adjacent the bottom of the coil trench to define the sides of the coil trench.

Significantly, the writer further includes a pole cover layer or pole-coil separator made up of a thin, e.g., less than 0.5 micrometers and more typically 0.1 to 0.4 micrometers in thickness, of insulating material such as alumina. The pole cover layer is deposited so as to cover at least the sides of the coil trench (i.e., the interior sides of the pole tips) and the bottom of the coil trench including write gap material deposited on the bottom of the coil trench. A bottom coil is then formed directly on the pole cover layer in the bottom of the coil trench and coil insulation is provided between the coil elements and adjacent the side walls and to cover the coil elements. In one embodiment, the coil insulation is provided in two layers of the same or differing materials. A planarized surface is provided for supporting a top coil and includes coplanar upper surfaces of the pole tips, ends of the pole cover layer, and the bottom coil insulation. The writer element includes the top coil, along with its insulation, which is formed on the planarized surface of the bottom coil insulation. The second layer of the top pole is formed over the top coil so as to contact the front and back pole tips and defines the yoke region of the writer.

DETAILED DESCRIPTION OF THE PREFERRED EMBODIMENTS

The present invention is directed toward a buried coil write element design for reducing separation distances between coils and pole elements in magnetic recording heads, toward write heads or read/write heads including the buried coil design (i.e., including a magnetically separating cover layer), toward methods of making a recording head according to the invention with improved dimensional control, and toward merged read/write heads and storage systems that incorporate buried coil designs as described herein. The write heads of the present invention include a buried bottom coil element that is fabricated after the formation of the front and back magnetic pole tips of the top pole. The front and back pole tips define a trench or recessed area in which a pole cover layer or pole-coil separator is provided of a non-magnetic material, such as alumina, and then the bottom coil is built directly on this cover layer or separator. A coil insulator is provided within the trench to separate the bottom coil turns and to cover the turns (i.e., to electrically insulate the bottom coil from the top coil), and the coil insulator can then be planarized to facilitate fabrication of the top coil, top coil insulator, and top pole yoke.

The "buried" bottom coil design of writer elements and heads of the present invention provides a number of advantages and/or addresses a number of problems with prior art heads. Because the bottom coil sits directly on the alumina or other non-magnetic material of the cover layer or separator, there is no need for an underlying resist or insulation layer. The cover layer or separator allows bottom coils to be positioned in relatively close proximity to adjacent front and back tips of the top pole, i.e., to provide a head with a reduced coil-pole separation distance and a reduced yoke length relative to convention heads. The bottom coil is planarized using photoresist or another insulating material that may be vacuum deposited or otherwise deposited among and over the bottom coil as a single process with one material or in two processes involving a single material or two insulating materials. The use of a deposited pole cover layer and coil insulator results in significantly reduced processing times, e.g., by reducing or even eliminating cure times and facilitating building of the top coil and top pole yoke element. Additionally, the forming of the front and back top pole tips (such as by photolithography) is unaffected by the bottom and top coil geometries.

Figure 1:
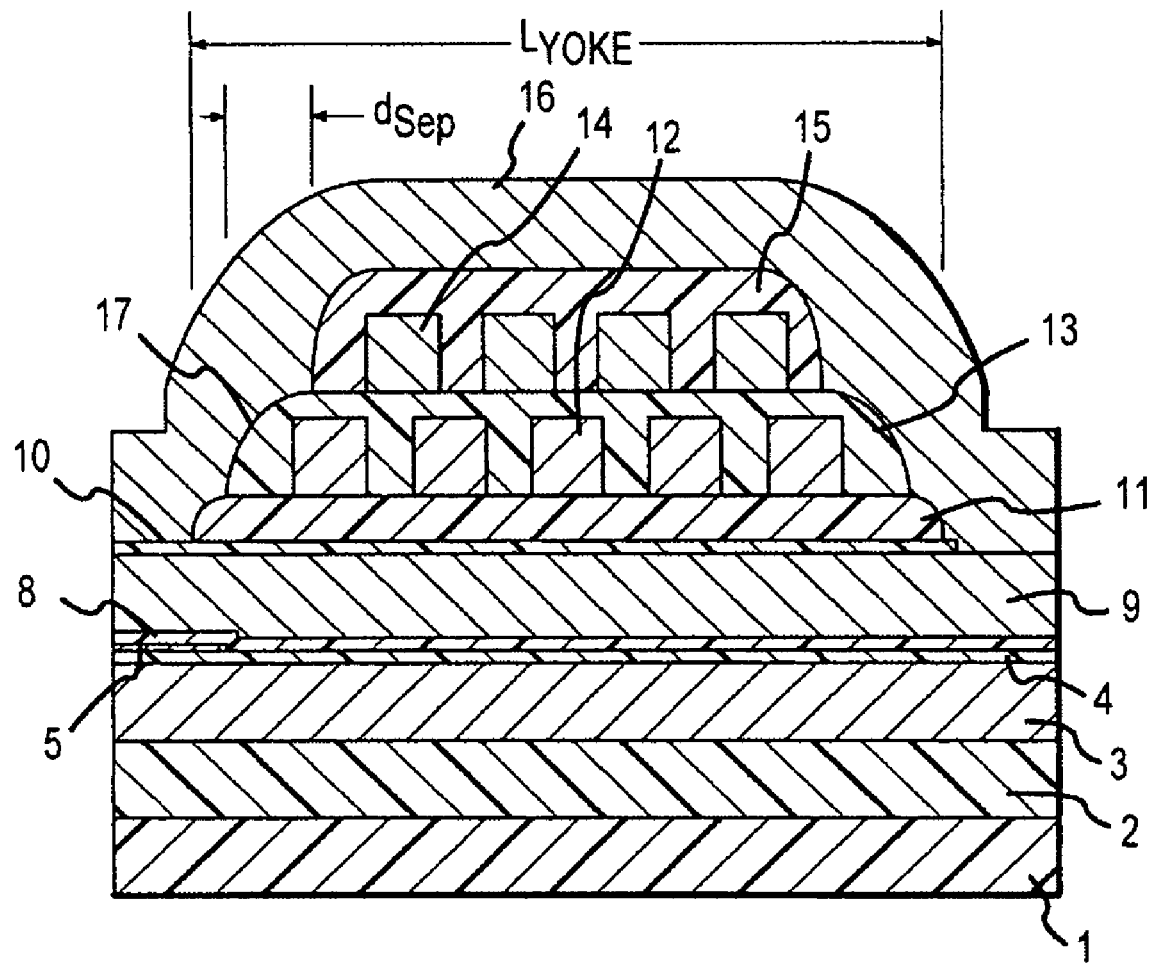
FIG. 1 is a sectional view of a magnetic read/write head with a conventional writer element configuration.
Figure 2:
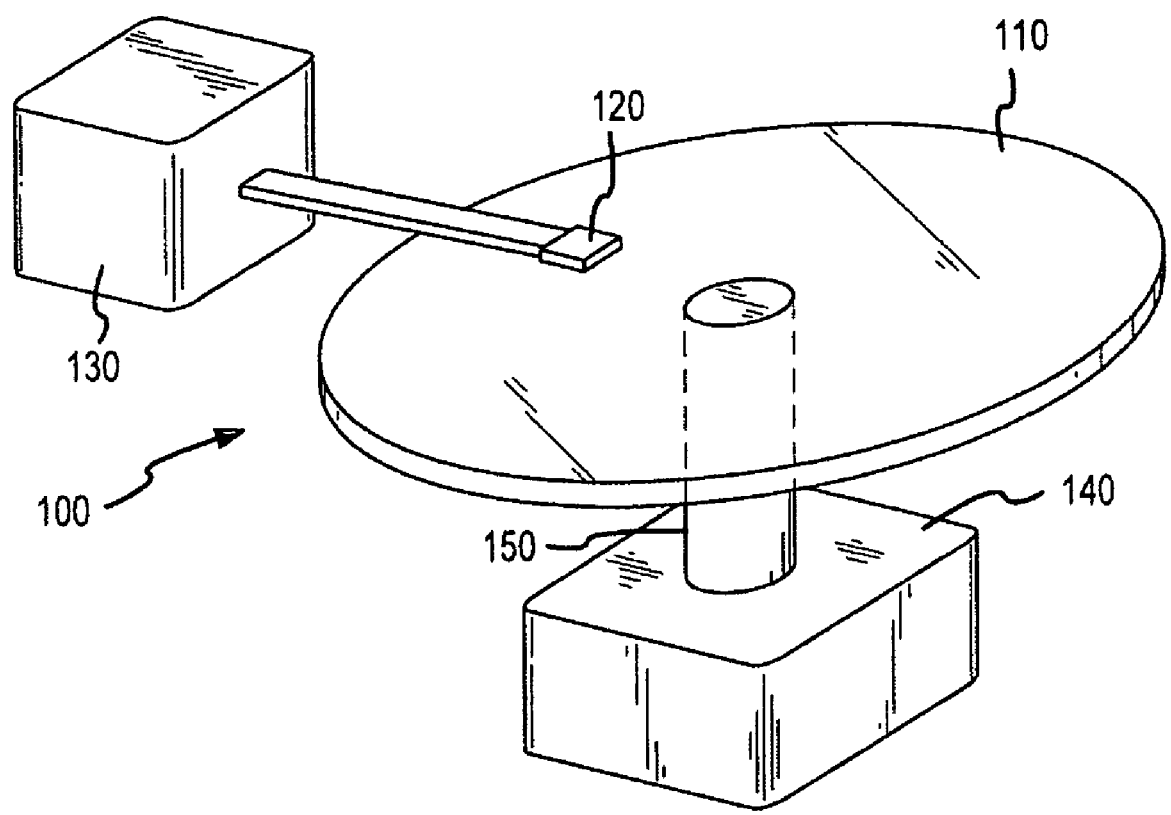
FIG. 2 illustrates a data storage and retrieval apparatus in which a writer element structure according of the present invention may be implemented, such as in a merged read/write head or other type of thin film magnetic recording head.

FIG. 2 shows a typical disk type magnetic data storage and retrieval apparatus 100 in which embodiments of the writer element of the invention may be incorporated. The writer element with a buried bottom coil of the present invention is located within a merged read/write head assembly 120 that rides above a magnetic storage media 110, depicted in FIG. 2 as a rotatable hard disk type storage media. The hard disk 110 is coupled to a motor 140 via a spindle 150 to provide rotation of the disk 110 relative to the head assembly 120. An actuating device 130 may be used to position the head assembly 120 above the surface of the media 110 to read and write data in the form of magnetic bits from and to the media 110. Of course, the data storage and retrieval apparatus 100 typically has several hard disks 110 and several corresponding head assemblies 120, not shown here for ease of description. The read portion of the read/write head assembly 120 is not limiting to the invention and its configuration may vary significantly to practice the invention as long as the read element is combined with a buried coil recording head or writer element as described below. Further, in some cases, a write head may be provided without a read sensor and the apparatus 100 would simply substitute such a write or recording head constructed according to the invention for the read/write head assembly 120.

Figure 3:
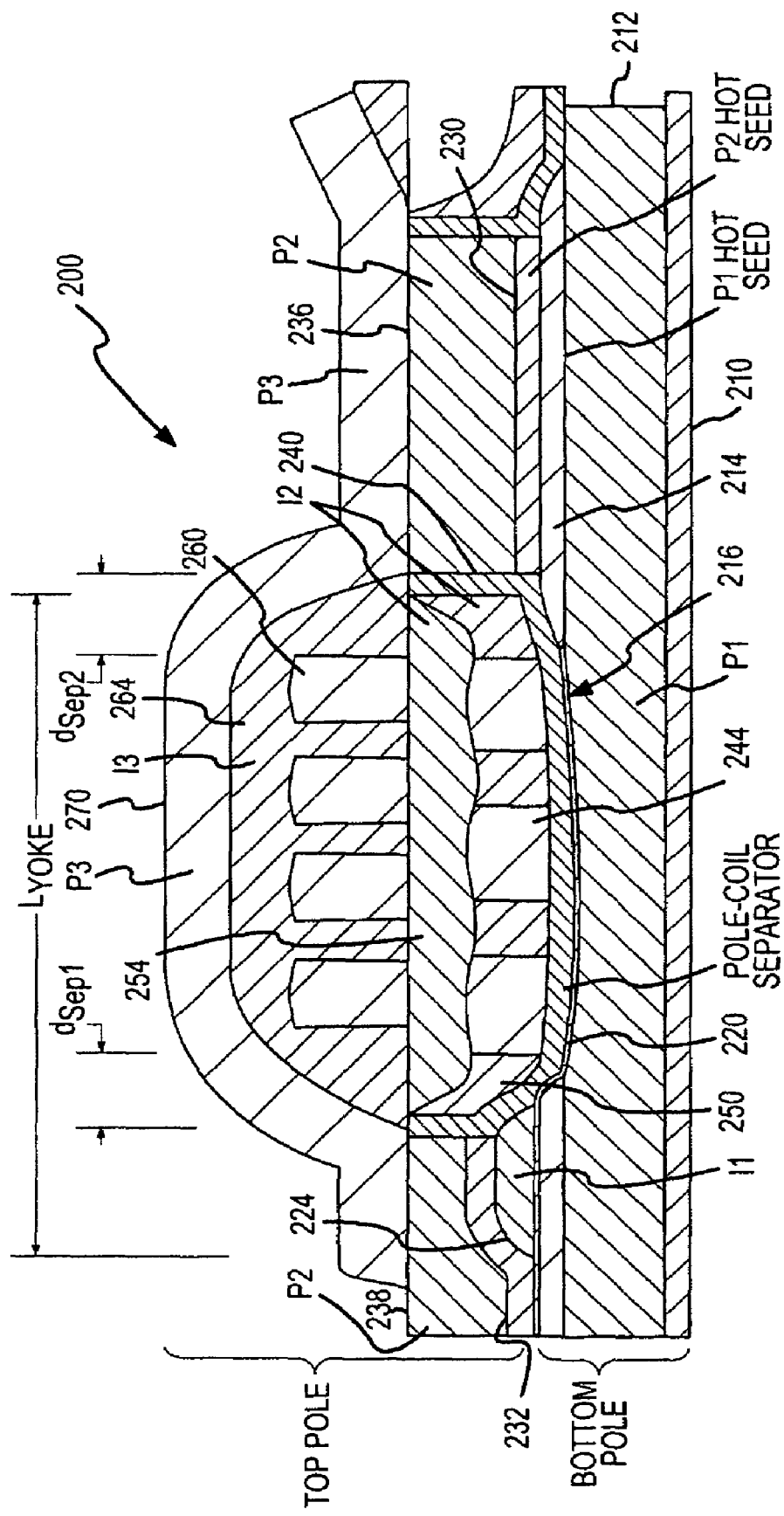
FIG. 3 is a sectional view of recording head (or writer element) constructed according to the present invention with a buried bottom coil in a trench defined by front and back pieces of the top pole.

With reference to FIG. 3, the present invention is shown embodied in a write element 200 that can be incorporated within a recording head or in a merged read/write head. The head 200 terminates at front edge or surface (i.e., the left end of the head 200 shown in FIG. 3) that defines an air bearing surface (ABS) for the head 200. If utilized within a read/write head, the bottom pole comprising layers 210, 212 would act as a second shield of the read portion. The read portion typically would be built on a ceramic substrate and include first and second shields formed adjacent one another with a layer of dielectric material sandwiched between the shields. The shields are typically formed of a soft magnetic alloy, such as NiFe alloy, CoNiFe alloy, CoZrNb alloy, and the like. A read sensor would then be embedded within the dielectric material layer adjacent the ABS of the head 200.

As shown in FIG. 3, the writer element 200 includes a first or bottom pole that can be formed of a single layer or as shown, of two layers, i.e., a lower film 210 upon which a second layer 212 with a seed layer 214 is deposited (such as by sputtering). The bottom pole layers 210, 212 may be fabricated of a number of magnetic materials such as NiFe alloy, CoNiFe alloy, CoZrNb alloy and other soft magnetic alloys or materials with the seed layer 214 being CoNiFe, CoFeN, or other high moment magnetic materials and the material used in the layers 210, 212 may be the same magnetic material or be a different magnetic material. Significantly, a trench or recessed area 216 is defined (at least in part) by the removal such as by etching of a portion of the bottom pole, such as by removal of a portion of the hot seed layer 214 and, in some cases, a portion of the second layer 212 of the bottom pole. The length of the trench 216 defined by the material removed from the bottom pole is typically less than the yoke length, $L_{YOKE}$, but greater than or equal to the bottom combined width of the bottom coils 244. As will become clear, the trench 216 is useful for allowing electrical insulation and magnetic separation materials to be deposited and a bottom coil to be "buried" in the trench 216 to facilitate more rapid and dimensionally accurate fabrication of the element 200.

The write element 200 further includes a write gap layer 220 of nonmagnetic or dielectric material that is deposited at least over the front portion of the bottom pole, i.e., over the front piece of the seed layer 214, and more preferably, deposited so as to extend over substantially the length of the bottom of the trench 216, i.e., to the back piece of the seed layer 214. A first insulator 224 formed of a film of electrically insulating material, e.g., alumina and the like, is positioned on top of an interior portion of the write gap layer 220 to define the throat height and to provide an inner edge defining a portion of the trench 216 side wall.

The top pole shown can be thought of as a two layer or bi-layer construction or pole layers P2 and P3 that includes back and front pole tips 236, 238 and an upper pole layer or yoke layer 270. By fabricating the top pole with two layers, the bottom coil 244 can be buried within the trench 216 defined in part by the interior side walls of the pole tips 236, 238 and then the top coil 260 and yoke layer 270 can be readily built on a planarized surface (i.e., a surface with minimal topography). The first layer P2 of the top pole includes a back pole tip 236 built upon a seed layer 230 and a front pole tip 238 built upon a seed layer 232 (which overlays the write gap layer 220 near the ABS of the element 200 and the first insulator 224). The pole tips 236, 238 are formed of a magnetic material such as CoNiFe alloy, NiFe alloy (i.e., permalloy), and the like. As will be explained with reference to FIG. 4, the pole tips 236, 238 and underlying seed layers 230, 232 are typically formed by material deposition and then later removal of material to provide substantially vertical interior side walls that define the sides of the trench 216 (although some slope can be provided if useful to support the material removal process).

According to an important aspect of the invention, the write element 200 includes a pole tip cover layer or pole-coil separator 240 that is deposited within the trench 216. The pole-coil separator 240 functions to insulate the pole tips 236, 238 from the adjacent bottom coils 244, and as such is typically made of alumina or other insulating material. The bottom coil 244 is then formed to sit directly on the pole-coil separator 240 and with a second insulator 12 being provide among and over the coils 244 to further separate the coils 244 from the pole tips 236, 238 and to electrically insulate (e.g., formed of alumina or material with similar electrical properties) the bottom coils 244 from the top coils 260.

In the embodiment shown in FIG. 3, the second insulator or bottom coil insulator 12 is formed of two layers, i.e., a lower or coil layer 250 that is deposited after formation of the coils 244 to insulate the individual coil turns in the bottom coil 244 and to further insulate the outer coils in the bottom coil 244 from the pole tips 236, 238 and an upper or cover layer 254 for insulating the bottom coil 244 from the top coil 260 and providing a surface for building the top coil 260. The coils 244 are preferably thin with a thickness in one embodiment of less than 2 μm. The use of two layers 250, 254 facilitates more rapid and accurate fabrication of the element 200, and the materials used for the layers 250, 254 may be the same or, more typically, the materials used are different but that provide desired insulating and fabrication properties. The bottom or lower coil layer 250 can be photoresist or alumina or other similar material. In one preferred embodiment, the bottom coil layer 250 is photoresist and the top layer 254 is alumina to facilitate processing, such as by reducing cycle time and better suiting equipment availability.

Significantly, the cover layer or pole-coil separator 240 can be relatively thin, e.g., less than 0.5 μm and more preferably between 0.1 and 0.4 μm, in part because it is deposited directly within the trench 216 and upon the high density alumina film or write gap layer 220. This very thin pole cover layer 240 when combined with the coil insulator layer 250 provides a significantly reduced front and rear separation distance, $d_{SEP1}$ and $d_{SEP2}$, between the coils 244 and the adjacent pole tips 238 and 236, respectively. For example, the front and rear separation distances, $d_{SEP1}$ and $d_{SEP2}$, typically can be achieved in the range of about 1 to 2 μm whereas prior heads typically had separation distances of at least about 3 μm. With the buried coil 244 within the trench 216 that is covered by cover layer 240, the top surface of the pole tips 236, 238 and the filled trench materials (i.e., cover layer 240 sides and cover insulator layer 254) can be processed to provide a desired surface for building the other components of the write element 200, such as with planarization.

The writer 200 further includes a top coil 260 that, as with bottom coil 244, is typically formed of copper or similar material, and that is positioned on the cover insulator layer 254. A third insulator or top coil insulator 13 is formed among and over the top coils as shown at 264 and is formed, for example, of alumina. The top pole further includes an upper pole layer or yoke layer 270, formed of material the same or similar to that used for the pole tips 236, 238, that covers and contacts at least a portion of the front pole tip 238 and covers the top coil 260 and back pole tip 236. The yoke length, LyoKE, of the top pole is significantly reduced compared with convention writer elements because of the reduced the reduced pole-coil separation distances, $d_{SEP1}$ and $d_{SEP2}$, provided by the thin pole cover layer 240 and buried bottom coil 244.

Figure 4:
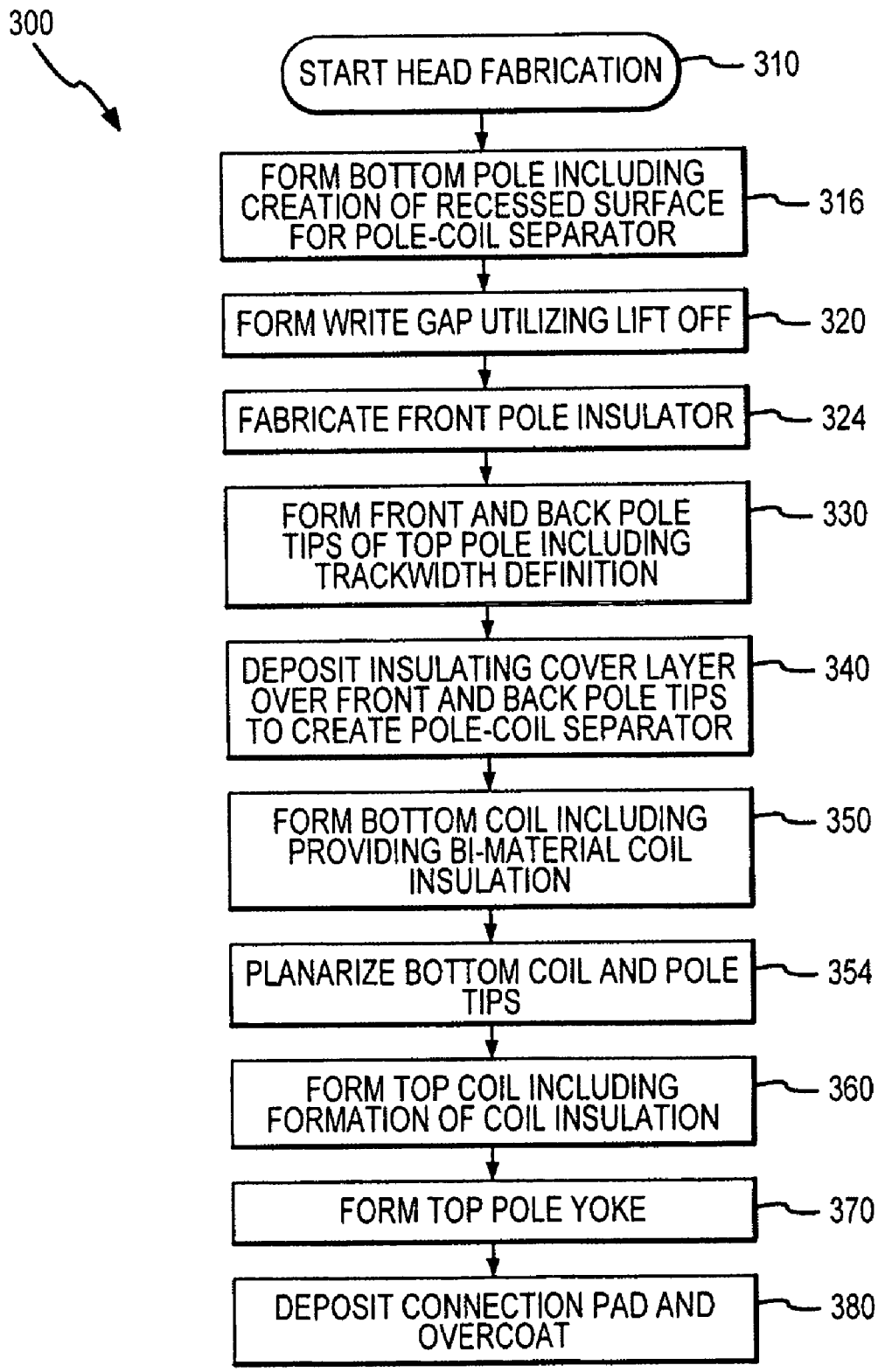
FIG. 4 is flow chart providing exemplary manufacturing steps of a head fabrication process according to the invention.

FIG. 4 illustrates an exemplary fabrication process 300 for creating write elements, such as element 200, of the invention. As discussed previously, the inventive features of the write elements can be provided alone within a head but more typically are provided in a merged read/write head. Because the read element portion of heads fabricated are not limiting to the invention, the manufacturing process 300 is discussed as starting at 310 with the provision of a substrate for fabricating a bottom pole but the bottom pole could just as easily and typically will provide the second shield of a read element. Additionally, the material deposition, layer formation, and material removal steps described in process 300 described with reference to the head or element 200 without illustrations being provided for each layer formation and then material removal as it is believed that these processes will be readily understood by those skilled art.

At 316, the bottom pole P1 is formed including creating a recessed surface, i.e., the bottom of the trench 216 for later deposition of the pole cover layer 240. The bottom pole P1 is typically formed by plating a first material layer 210 and then defining the shape of the layer 210 such as with chemical mechanical polishing (CMP). A second material layer 212 is deposited on the first material layer 210 such as by sputtering a magnetic film, e.g., a film of NiFe or the like. A seed layer 214 is then provided on the second material layer 212 and the bottom surface of the trench 216 is formed by removing material from the bottom pole, such as by ion beam etching or other processes. At 320, a deposition of metal, such as NiCr, is performed to form the write gap 220, with a photoresist mask first being provided and lift off being used to provide the desired shape of the write gap 220.

At 324, the front pole insulator 224 is formed of insulating material. At 330, the lower layer P2 of top pole is formed using seed layer 230, 232 followed by deposition of a magnetic material, such as CoNiFe and the like, which is then partially etched to form the front pole tip 238 and the back pole tip 236. The etching or other material removal process is performed in a manner that defines substantially vertical inner side walls that define the sides of the trench 216, in which the bottom coil 244 is later "buried." The pole tips 236, 238 are preferably shaped to define the track width of the writer element 200.

At 340, a thin, e.g., 0.1 to 0.4 µm, layer of insulating material, such as alumina, is deposited over the pole tips 236, 238 and within the trench 216 to form the pole cover layer or pole-coil separator 240. Connections to the pole tips 236, 238 may be created during step 354 by CMP or otherwise removing a portion(s) of the pole cover layer 240. As will be appreciated, the deposition of the coil cover 240 rather than curing layers of photoresist results in a much quicker process, a thinner separation distance between the coils 244 and pole tips 236, 238, and facilitates later formation of the bottom coil 244.

In this regard, the coil 244 is next formed at 350 such as with copper or other conducting material that is preferably thin, e.g., less than about 2 µm, directly upon the deposited pole-coil insulator or pole cover layer 240. Also, at 350, the second insulator 12 is formed by coating the pole-coil insulator 240 (and, in some cases, a portion of the coils 244) with a layer of insulating material, such as alumina, to form the coil insulating layer 250 and then second depositing another layer of insulating material over the coil insulating layer 250 and coils 244 to fill the trench 216 (i.e., bury the coils 244) and form the covering insulation layer 254. In some preferred embodiments, the insulating material used for the two portions of the second insulator 12 are formed of differing materials to create a bi-material bottom coil insulator 12 such as any two compatible photoresist materials and/or vacuum deposited insulating materials.

At 354, the pole tips 236, 238, the pole-coil insulator 240, and the covering insulation layer 354 are planarized (such as with CMP) to provide a desirable (i.e., planar) surface for building the top coil 250 and yoke region of the top pole 270. Additionally, such planarization provides enhanced dimension control. At 360, the top coil 260, such as a film of copper, is formed, such as by plating, on the now planar covering insulation layer 254. A third insulator 13 is formed as shown at 264, such as of deposited photoresist. At 370, the top pole yoke layer 270 is formed, such as by sputtering a thin film of NiFe or other magnetic material, and this layer 270 is preferably kept relatively thin to decrease the size of the element 200, such as with a thickness less than 3 µm and more preferably in the range of 1 to 3 µm. As explained above, the yoke length, $L_{YOKE}$, is significantly shorter relative to conventional writer elements due to the use of the pole cover layer 240 and buried coil design. At 380, additional processing steps are preformed to complete the writer element 200 such as with forming a connection pad, such as of copper, gold, and/or other conductors, and deposition of an overcoat (not shown), such as a layer of alumina or other insulator. As a result of the design of the head 200 and the above processing 300, the yoke length, $L_{YOKE}$, is typically achievable in the range of about 9 to 11 µm, which is a large improvement over prior head designs that had yokes with lengths in the range of 12 to 17 µm or more.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the specific materials described above can be varied significantly to practice the invention as will be readily appreciated by those skilled in the art.

We claim:

1. A method of fabricating a thin film write head, comprising:
    forming a first magnetic pole with an upper surface;
    removing a portion of the upper surface to create a bottom of a coil trench;
    depositing a layer of write gap material on the upper surface of the first magnetic pole and at least a portion of the bottom of the coil trench;
    forming a first layer of a second magnetic pole, wherein the first layer includes a front pole tip and a back pole tip each having interior side walls substantially perpendicular to the upper surface of the magnetic pole and being space apart so as to define sides of the coil trench;
    depositing a film of insulating material over the side walls of the pole tips and the bottom of the coil trench; and
    forming an electrically conducting coil with coil insulation materials upon the deposited film of insulating material, the coil insulation materials filling the coil trench.

2. The method of claim 1, wherein the deposited film of insulating material has a thickness of less than about 0.5 micrometers.

3. The method of claim 1, wherein the forming of the coil includes first depositing the coil insulation materials in a first layer to fill gaps between elements in the coil and adjacent the side walls of the pole tips and second depositing the coil insulation materials in a second layer to cover the elements in the coil.

4. The method of claim 3, further including:
planarizing the first layer of the second magnetic pole and the coil insulation materials to provide a substantially continuous, coplanar surface;
forming an additional electrically conducting coil with coil insulation materials isolating the additional coil, the additional coil being positioned on the coil insulation materials portion of the planarized coplanar surface; and
forming a second layer of the second magnetic pole over the additional coil and at least portions of the pole tips.

5. The method of claim 3, wherein the first layer coil insulation layers are photoresist and the second layer coil insulation materials are alumina.

6. The method of claim 1, further including after the write gap layer depositing, performing lift off to remove a portion of the deposited write gap material to define a shape of a write gap for the write head.

7. The method of claim 1, wherein the write gap is deposited on substantially all of the bottom of the coil trench.

8. A method of fabricating a writer for use in a data recording head assembly, comprising:
forming a bottom magnetic pole having a substantially planar upper surface including a recessed surface defining a bottom of a coil trench;
depositing a layer of write gap material on the upper surface of the bottom magnetic pole and at least a portion of the bottom of the coil trench to form a write gap layer;
forming a top magnetic pole disposed above the bottom magnetic pole and the write gap layer including a first layer comprising a front pole tip and a back pole tip spaced apart with side walls defining side walls of the coil trench;
depositing a film of insulating material with a thickness over the recessed surface of the bottom magnetic pole and over the side walls of the top magnetic pole tips to form a pole cover layer that contacts and covers a portion of the write gap layer;
forming an electrically conducting coil with elements disposed on the pole cover layer between the top pole tips; and
covering the electrically conducting coil with an insulator, wherein the insulator further fills gaps between the coil elements and the top pole tips.

9. The method of claim 8, wherein the pole tips each include an upper surface distal to the bottom magnetic pole with the upper surfaces being substantially coplanar.

10. The method of claim 8, wherein the top magnetic pole includes a second layer of magnetic material defining a yoke region above the defined coil trench and includes a top electrically conducting coil with elements disposed on the insulator, the top coil elements being electrically insulated by a top coil insulator formed of electrically insulating material disposed over the top coil elements and the insulator.

11. A method of fabricating a writer for use in a data recording head assembly comprising:
forming a bottom magnetic pole having a substantially planar upper surface including a recessed surface defining a bottom of a coil trench;
depositing a layer of write gap material on the upper surface of the bottom magnetic pole and at least a portion of the bottom of the coil trench to form a write gap layer;
forming a top magnetic pole disposed above the bottom magnetic pole and the write gap layer including a first layer comprising a front pole tip and a back pole tip spaced apart with side walls defining side walls of the coil trench wherein the pole tips each include an upper surface distal to the bottom magnetic pole with the upper surfaces being substantially coplanar;
depositing a film of insulating material with a thickness over the recessed surface of the bottom magnetic pole and over the side walls of the top magnetic pole tips to form a pole cover layer that contacts and covers a portion of the write gap layer, wherein the portion of the write gap layer covered by the pole cover layer comprises the write gap layer extending to cover and contact the portion of the recessed surface;
forming an electrically conducting coil with elements disposed on the pole cover layer between the top pole tips; and
covering the electrically conducting coil with an insulator, wherein the insulator further fills gaps between the coil elements and the top pole tips.

12. A method for fabricating a thin film write head for use in a data recording head assembly, comprising:
forming a bottom magnetic pole having a substantially planar upper surface including a recessed surface defining a bottom of a coil trench;
depositing a write gap layer on the upper surface of the bottom magnetic pole;
providing a top magnetic pole above the bottom magnetic pole and the write gap layer including a layer of magnetic material comprising a front pole tip and a back pole tip spaced apart with side walls defining side walls of the coil trench, wherein the pole tips each include an upper surface distal to the bottom magnetic pole with the upper surfaces being substantially coplanar;
forming a pole cover layer of insulating material over the recessed surface of the bottom magnetic pole and over the side walls of the top pole tips, the pole cover layer contacting and covering a portion of the write gap layer extending to cover and contact a portion of the recessed surface;
forming an electrically conducting coil with elements on the pole cover layer between the top pole tips; and
covering the coil with an insulator, wherein the insulator fills gaps between the coil elements and the top pole tips.

13. The method of claim 12, wherein the insulator comprises a coil insulator layer disposed among the coil elements and covering the side walls of the pole tips and a covering insulation layer disposed over the coil insulator layer and the coils.

14. The method of claim 13, wherein the coil insulator layer is formed of a first insulating material and the covering insulator layer is formed of a second insulating material that differs from the first insulating material.

15. The method of claim 12, wherein the covering insulator includes an upper surface distal to the coil elements that is substantially planar and substantially coplanar with the upper surfaces of the pole tips.

16. The method of claim 12, wherein a separation distance measured between a proximal portion of the coil and the front pole tip is between about 1 micrometer and about 2 micrometers.

17. The method of claim 12, wherein the top magnetic pole includes an additional layer of magnetic material defining a yoke region above the defined coil trench that includes a top electrically conducting coil with elements disposed on the insulator, the top coil elements being electrically insulated by a top coil insulator formed of electrically insulating material disposed over the top coil elements and the insulator.

18. The method of claim 12, wherein the insulator comprises a deposited file of insulating material that has a thickness of less than about 0.5 micrometers.

19. The method of claim 12, wherein the forming of the coil includes first depositing a coil insulation materials in a first layer to fill gaps between the elements in the coil and adjacent the side walls of the pole tips and second depositing a coil insulation material in a second layer to cover the elements in the coil.

20. The method of claim 19, further including:
    planarizing the first layer of the top magnetic pole and the coil insulation materials to provide a substantially continuous, coplanar surface;
    forming an additional electrically conducting coil with coil insulation materials isolating the additional coil, the additional coil being positioned on the coil insulation materials portion of the planarized coplanar surface; and
    forming a second layer of the second magnetic pole over the additional coil and at least portions of the pole tips.

21. A method for fabricating a thin film write head for use in a data recording head assembly, comprising:
    forming a bottom magnetic pole having a substantially planar upper surface including a recessed surface defining a bottom of a coil trench;
    depositing a write gap layer on the upper surface of the bottom magnetic pole;
    providing a top magnetic pole above the bottom magnetic pole and the write gap layer including a layer of magnetic material comprising a front pole tip and a back pole tip spaced apart with side walls defining side walls of the coil trench, wherein the pole tips each include an upper surface distal to the bottom magnetic pole with the upper surfaces being substantially coplanar;
    forming a pole cover layer of insulating material over the recessed surface of the bottom magnetic pole and over the side walls of the top pole tips, the pole cover layer contacting and covering a portion of the write gap layer extending to cover and contact a portion of the recessed surface, wherein the write gap layer extends to cover and contact substantially all of the recessed surface of the bottom magnetic pole;
    forming an electrically conducting coil with elements on the pole cover layer between the top pole tips; and
    covering the coil with an insulator, wherein the insulator fills gaps between the coil elements and the top pole tips.

* * * * *